April 30, 1940.          C. W. RICE          2,199,141
DYNAMOELECTRIC MACHINE
Filed Aug. 1, 1939
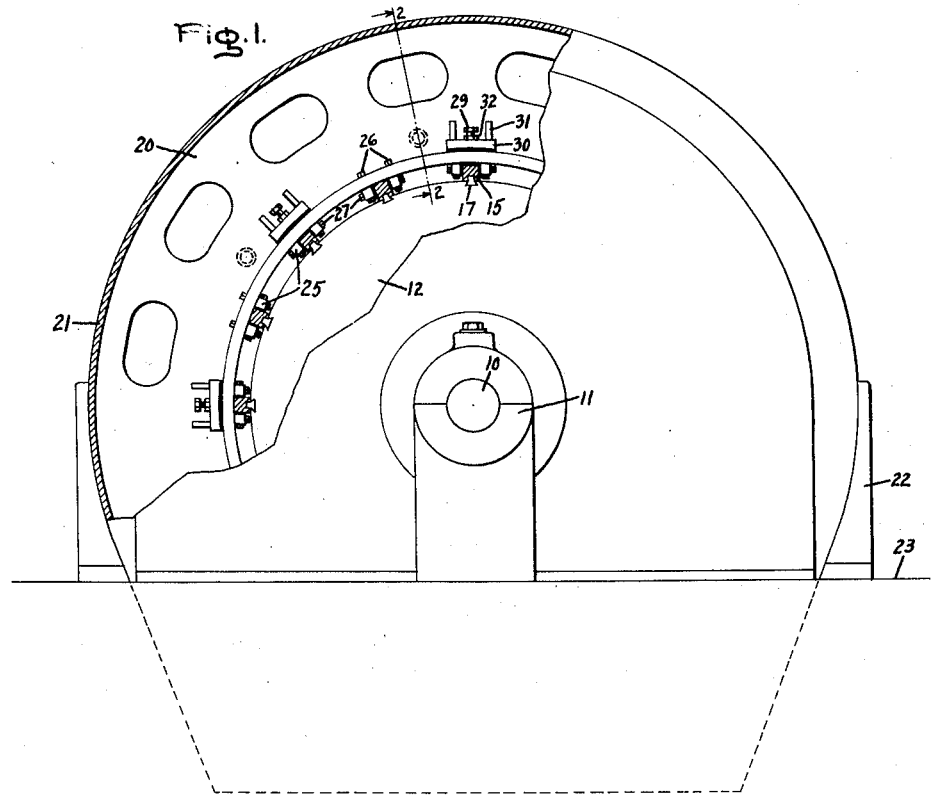
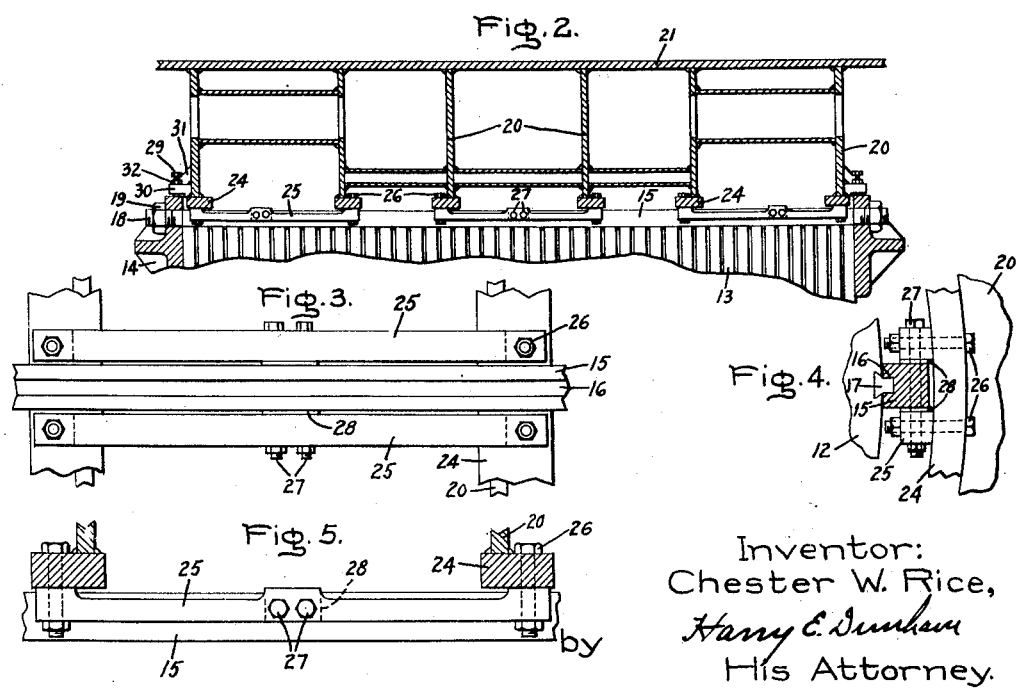
Inventor:
Chester W. Rice,
by Harry E. Dunham
His Attorney.

Patented Apr. 30, 1940

2,199,141

UNITED STATES PATENT OFFICE 2,199,141

DYNAMOELECTRIC MACHINE

Chester W. Rice, Schenectady, N. Y., assignor to General Electric Company, a corporation of New York Application August 1, 1939, Serial No. 287,767

6 Claims. (Cl. 171—252)

My invention relates to improvements in dynamoelectric machines, and particularly to an arrangement for minimizing the effect on the support of such machines of electromagnetic distortions and vibrations produced by a rotating magnetic field in such machines.

In certain types of dynamoelectric machines, considerable vibration may be set up in the stationary member of the machine by electromagnetic distortions which are created by the rotating magnetic field set up by the rotatable member of the machine. This is particularly noticeable in two pole machines wherein the rotatable member is excited to provide two magnetic poles which rotate within a stationary member formed of magnetic material. Since the magnetic attractive force of the rotor is proportional to the square of the flux density, it is always positive. This magnetic attractive force tends to distort the stator substantially into an elliptical form, and this deformation rotates about the stationary member producing two vibrations thereof for each revolution of the rotor. If these vibrations are transmitted through the stationary member to the supporting foundation, the foundation and other equipment supported thereby may be subjected to undesirable destructive forces. The stationary member of such a machine usually is provided with a laminated core in which the armature winding is arranged, and this assembly is mounted within a stationary supporting frame. It generally has been accepted that if the stiffness of the stationary member can be increased, the distortion thereof due to the rotating magnetic field may be reduced correspondingly. It has been found, however, that the rigid connection between the laminated core and the supporting frame does not provide an element having a deep beam stiffness, but rather the effect of a combination of two beams, one above the other, so that the resultant stiffness is merely the sum of the stiffness of the two elements. By actual tests, it has been found that the stiffness of a conventional laminated core in this type machine is about seven times that of a supporting frame, and therefore, the stiffening of the frame adds relatively little to the resultant stiffness of the stationary member of the machine. It has been proposed by Lloyd P. Grobel in his copending application, Serial No. 287,735, filed August 1, 1939, and assigned to the same assignee as this application, to mount the core of such a machine within the stationary supporting frame by a plurality of flexible beam springs. These springs should give a maximum degree of flexibility to the core to allow for the magnetic distortion thereof without transmitting the distorting forces to the supporting frame. Furthermore, these supporting springs should allow only a relatively small deflection to the core due to the weight thereof, and also should avoid torsional resonance with any pulsating torques which may occur due to short circuits or unbalanced operation. It has been found that with two-pole machines of this type, the stationary core vibrates with a four node vibration which is not entirely radial, but that the nodal points have torsional displacements equal to about one-half the maximum radial displacement thereof. By supporting the laminated core within the stationary supporting frame on a flexible support which provides these characteristics, very little vibration will be transmitted to the stationary supporting frame, so that the transmission of destructive forces to the foundation is substantially eliminated.

An object of my invention is to provide a dynamoelectric machine having an improved arrangement for supporting a stator core within a stator frame.

Another object of my invention is to provide an improved flexible support for a magnetic core subjected to vibratory forces to minimize the transmission of such forces between the core and its supporting frame.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is an end view, partially broken away, of a dynamoelectric machine provided with an embodiment of my improved stationary member and supporting arrangement; Fig. 2 is a partial sectional view taken along line 2—2 of Fig. 1; Fig. 3 is a fragmentary view showing the relative arrangement of my improved supporting springs and their connection to the frame and core of the stationary member; Fig. 4 is a fragmentary enlarged end view of my improved flexible supporting elements and their connection to the frame and core as shown in Figs. 1 and 2; and Fig. 5 is a fragmentary side elevational view of the elements illustrated in Fig. 3.

Referring to the drawing, I have shown my invention in connection with a dynamoelectric machine having a rotatable member mounted upon a shaft 10. The rotatable member shaft is supported by pedestal bearings mounted in bearing housings 11 arranged at each end of the machine. The rotatable member is provided with a magnetic core and an exciting winding, and is arranged to react electrodynamically with the stationary member, which is provided with an armature winding supported in a laminated magnetic core 12 mounted in a stationary supporting frame. The laminated core 12 includes a plurality of laminations 13 which is secured in assembled relation between end plates 14 at each end thereof and drawn together by a plurality of clamping bars 15. A plurality of these bars is arranged in circumferentially spaced apart relation about the periphery of the laminated core 12, and each bar is formed with a groove 16 into which is secured a dovetail key 17 which also is fitted into a dovetail groove in the outer edge of the laminated core 12. The outer ends 18 of the clamping bars 15 are threaded and extend through openings formed in the end plates 14. The stiffness of the magnetic core 12 may be adjusted by changing the pressure with which the laminations are clamped together. This pressure should be such that no substantial displacement occurs between adjacent laminations due to the electromagnetic distortion of the core in order to prevent chafing of the insulation on the armature winding arranged in the slots of this core. The clamping pressure between the two end plates 14 may be varied by adjusting nuts 19 which engage the threaded ends 18 of the clamping bars 15. The stationary supporting frame includes a plurality of annular supporting and stiffening plates 20 arranged in longitudinally spaced apart relation and secured within an outer wrapper plate 21. This supporting frame is provided with legs 22 on each side thereof, which are mounted upon a supporting foundation 23. To provide a flexible support which is substantially rigid longitudinally of the stationary member, I provide a mounting ring 24 welded to the inner edge of each of the plates 20 and a plurality of beam springs 25 arranged in longitudinally spaced apart sets and circumferentially spaced apart relation about the laminated core 12 in each of these sets. These beam springs 25 are arranged in pairs, one on each side of a bar 15, and are formed with an enlarged portion adjacent each end and adjacent the central portion thereof. The beam springs 25 are secured adjacent the ends thereof to the supporting rings 24 by bolts 26 which extend through the enlarged ends and are secured adjacent the central portion thereof to the bars 15 by bolts 27, which extend through the enlarged central portion of the springs and through the clamping bars 15. A spacing block 28 is arranged between each of the springs 25 and the adjacent clamping bar 15 to provide a slight clearance between the spring and the bar to allow for slight tangential flexing of the springs 25 without resulting in contact between the springs and the bars 15. In order to provide the desired radial and tangential flexibility to the supporting arrangement, the beam springs 25 are constructed so that their flexibility is substantially twice as great in a radial direction as in a tangential or circumferential direction with respect to the laminated core 12. This is obtained by making the springs 25 substantially twice as wide in a tangential direction as they are wide in a radial direction, as can readily be seen from Figs. 3 and 5. This arrangement of flexible springs provides a support for the laminated core which is substantially rigid longitudinally thereof and flexible radially and tangentially thereof, with the radial flexibility substantially greater than the tangential flexibility of the support, and allows for slight tangential and radial displacements of the laminated core within the stationary supporting arrangement, so that very little vibration is transmitted to the supporting frame and foundation 23.

It has been found that the deformation of the core of such a machine is substantially greater adjacent the central portion thereof than at the ends thereof, and in certain instances, the displacement at the ends of the core is negligibly small. It, therefore, is not necessary in all instances to support flexibly the outer ends of the laminated core. In order to provide a rigid support between the core and the frame adjacent the ends thereof, adjustable stop or limit screws 29 threadedly engage openings in stop plates 30 which are rigidly welded to the outer side of the outer stiffening plates 20 adjacent the inner edge thereof. Gusset plates 31 are welded to the stop plates 30 and to the outer surface of the outer stiffening plates 20 to provide a more rigid connection between the stops 30 and the plates 20. A plurality of these limit screws 29 and stop plates 30 is arranged in circumferentially spaced apart relation about the inner edge of each of the outer stiffening plates 20. The limit screws 29 are adjusted in relation to the stop plates 30 and the outer edge of the end plates 14 so as to provide a rigid support for the end plates 14 and the laminated core 12 on the outer stiffening plates 20. A lock nut 32 threadedly engages each limit screw 29 to insure against accidental loosening after it has been adjusted to provide the desired rigid support for the end plate 14. This rigid end support and flexible intermediate support is not my invention but is the invention of Hamilton D. Taylor and forms the subject of his co-pending application, Serial No. 287,720, filed August 1, 1939, and assigned to the same assignee as this application. In this manner, the outer ends of the laminated core of the stationary member of the dynamoelectric machine are rigidly supported upon the frame of the stationary member and the beam springs 25 flexibly support the remainder of the core on the stationary member supporting frame.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamoelectric machine having a rotatable member and a stationary member, said stationary member being provided with a frame and a core arranged within said frame, and means for supporting said core in said frame substantially rigidly longitudinally thereof, said supporting means being flexible radially and tangentially of said core and the radial flexibility of said supporting means being substantially greater than the tangential flexibility thereof.

2. A dynamoelectric machine having a rotatable member and a stationary member, said stationary member being provided with a frame and a core arranged within said frame, and means arranged at longitudinally spaced apart points for supporting said core in said frame substantially rigidly longitudinally thereof, said supporting means being flexible radially and tangentially of said core with the radial flexibility of said supporting means substantially greater than the tangential flexibility thereof.

3. A dynamoelectric machine having a rotatable member and a stationary member, said stationary member being provided with a frame and a laminated core arranged within said frame, and means for supporting said laminated core in said frame substantially rigidly longitudinally thereof, said supporting means being flexible radially and tangentially of said core and the radial flexibility of said supporting means being substantially twice the tangential flexibility thereof.

4. A dynamoelectric machine having a rotatable member and a stationary member, said stationary member being provided with a frame and a core arranged within said frame, and means including a plurality of beam springs arranged at longitudinally and circumferentially spaced apart points for supporting said core in said frame substantially rigidly longitudinally thereof, said beam spring supporting means being flexible radially and tangentially of said core with the radial flexibility of said beam spring supporting means substantially greater than the tangential flexibility thereof.

5. A dynamoelectric machine having a rotatable member and a stationary member, said stationary member being provided with a frame, a laminated core arranged within said frame, means including a plurality of clamping bars for securing and retaining said laminated core in assembled relation, means for securing and retaining said laminated core in assembled relation, and means including a plurality of beam springs secured adjacent the ends thereof to said frame and secured intermediate the ends thereof to said core assembly retaining means for supporting said core in said frame, said beam springs being arranged in longitudinally spaced apart sets and being arranged in circumferentially spaced apart relation in each of said sets, each of said beam springs being flexible radially and tangentially of said core with the radial flexibility substantially greater than the tangential flexibility thereof.

6. A dynamoelectric machine having a rotatable member and a stationary member, said stationary member being provided with a frame, a laminated core arranged within said frame, means including a plurality of clamping bars for securing and retaining said laminated core in assembled relation, and means including a plurality of beam springs secured adjacent the ends thereof to said frame and secured intermediate the ends theroef to said clamping bars for supporting said core in said frame, said beam springs being arranged in longitudinally spaced apart sets and being arranged in pairs circumferentially spaced apart in each of said sets with one of each of said springs of each pair arranged on opposite sides of said clamping bars, each of said beam springs being flexible radially and tangentially of said core with the radial flexibility substantially greater than the tangential flexibility thereof.

CHESTER W. RICE.